(12) United States Patent
Fang

(10) Patent No.: US 10,088,034 B2
(45) Date of Patent: Oct. 2, 2018

(54) DOUBLE-NUT COOLING BALL SCREW

(71) Applicant: HIWIN TECHNOLOGIES CORP., Taichung (TW)

(72) Inventor: You-Xin Fang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 111 days.

(21) Appl. No.: 15/430,843

(22) Filed: Feb. 13, 2017

(65) Prior Publication Data

US 2018/0231117 A1 Aug. 16, 2018

(51) Int. Cl.
*F16H 57/04* (2010.01)
*F16H 25/22* (2006.01)
*F16H 25/20* (2006.01)
*F16H 25/24* (2006.01)

(52) U.S. Cl.
CPC ..... *F16H 57/0497* (2013.01); *F16H 25/2006* (2013.01); *F16H 25/2204* (2013.01); *F16H 25/24* (2013.01); *F16H 57/043* (2013.01); *F16H 57/0412* (2013.01)

(58) Field of Classification Search
CPC .. F16H 25/2006; F16H 25/2204; F16H 25/24; F16H 25/2418; F16H 57/0412; F16H 57/043; F16H 57/0497; B23Q 11/125
USPC ........... 74/89.23, 89.3, 89.43, 89.44, 424.72; 403/188, 194, 292
See application file for complete search history.

(56) References Cited

U.S. PATENT DOCUMENTS

| | | | | |
|---|---|---|---|---|
| 9,279,487 | B1 * | 3/2016 | Guglietti | F16H 25/2214 |
| 2003/0089187 | A1 * | 5/2003 | Liao | F16H 25/2204 74/424.81 |
| 2011/0154924 | A1 * | 6/2011 | Chiu | F16H 57/0497 74/89.43 |
| 2012/0144944 | A1 * | 6/2012 | Yamamoto | F16H 57/0412 74/424.81 |
| 2012/0266703 | A1 * | 10/2012 | Chuo | F16H 57/0497 74/89.44 |
| 2015/0377342 | A1 * | 12/2015 | Chu | F16H 57/0497 74/424.81 |
| 2017/0023124 | A1 * | 1/2017 | Minakuchi | F16H 57/0497 |
| 2017/0146114 | A1 * | 5/2017 | Chen | F16H 57/0497 |
| 2017/0159778 | A1 * | 6/2017 | Jeng | F16H 25/2214 |

* cited by examiner

*Primary Examiner* — Victor L MacArthur
*Assistant Examiner* — Joseph Brown
(74) *Attorney, Agent, or Firm* — Rosenberg, Klein & Lee

(57) ABSTRACT

A double-nut cooling ball screw includes two nuts threadedly engaging with a threaded shaft and having connecting end portions facing toward each other and cooling channel assemblies in fluid communication through coupling holes in the connecting end portions, and a spacer interposed between the connecting end portions and having notched recesses for accommodating guiding assemblies. Each guiding assembly is rotatable relative to the nuts between a non-stored position for facilitating fastening thereof, and a stored position to be concealed between the nuts.

10 Claims, 8 Drawing Sheets

DOUBLE-NUT COOLING BALL SCREW

FIELD

The disclosure relates to a ball screw, and more particularly to a double-nut cooling ball screw.

BACKGROUND

A conventional double-nut cooling ball screw as disclosed in Taiwanese Utility Model No. M444445 generally includes a front nut member having spacedly displaced cooling channels, a rear nut member having spacedly displaced cooling channels, a preload member fittingly disposed between the front and rear nut members and having through holes for communicating the cooling channels in the front and rear nut members, and a plurality of sealing members each disposed at the juncture of the through hole and the cooling channel of a respective one of the front and rear nut members, such that a coolant can circulate in the cooling channels to cool the ball screw.

Such cooling ball screw is relatively inconvenient to assemble. The sealing members are firstly placed at ends of the cooling channels, and the front and rear nut members are then threadedly engaged with a threaded shaft to be adjoined to each other to sandwich the preload member. During the threaded movement, the sealing members are easily separated from the front and rear nut members. Moreover, the sealing members are easily scratched by the preload member, which may weaken or lose its sealing effect.

Another conventional ball screw as disclosed in U.S. Pat. No. 9,133,921 generally includes a threaded shaft, two nuts threadedly engaging with the threaded shaft, a spacer tightly sandwiched between the nuts and having through holes, and two ring-shaped sealing members connected between the nuts and inserted into the through holes. Each nut has two counterbores, each of which extends axially from a connecting end thereof to sealingly receive an end portion of the sealing member. The counterbore (a receiving counterbore) of one of the nuts has a depth sufficient to accommodate the entire of the sealing member. The through holes in the nuts are connected through the through holes in the spacer and the sealing members, such that a coolant can circulate therein to cool the ball screw.

However, an additional tool is required to conduct assembly. Following accommodation of the sealing members in the receiving counterbores, the nuts and the spacer are mounted on the threaded shaft. A round bar (a pressing tool) is inserted into the through hole in the nut to press each of the sealing members to another counterbore, which renders the assembly process cumbersome.

SUMMARY

Therefore, an object of the disclosure is to provide a double-nut cooling ball screw that can alleviate at least one of the drawbacks of the prior arts.

According to the disclosure, the double-nut cooling ball screw includes a threaded shaft extending along an axis, a first nut, a second nut, a spacer and a plurality of guiding assemblies. The first nut threadedly engages with the threaded shaft through a plurality of balls, and includes a head end portion, a first surrounding wall which extends from the head end portion along the axis to terminate at a first connecting end portion, a first cooling channel assembly which is formed in the first surrounding wall, an inlet port which is formed through the head end portion and which is in fluid communication with the first cooling channel assembly, an outlet port which is formed through the head end portion and which is in fluid communication with the first cooling channel assembly, and a plurality of first coupling holes which are formed through the first connecting end portion and which are angularly displaced from each other about the axis. Each of the first coupling holes is in fluid communication with the first cooling channel assembly. The second nut threadedly engages with the threaded shaft through a plurality of balls, and includes a second surrounding wall which extends along the axis toward the first connecting end portion to terminate at a second connecting end portion, a second cooling channel assembly which is formed in the second surrounding wall, and a plurality of second coupling holes which are formed through the second connecting end portion to be respectively aligned with the first coupling holes in a direction of the axis, and each of which is in fluid communication with the second cooling channel assembly. The spacer is interposed between the first and second connecting end portions, and has an axial hole to be sleeved on the threaded shaft, and a plurality of notched recesses which are recessed radially and inwardly from a peripheral surface of the spacer and which are angularly displaced from each other about the axis. The guiding assemblies are respectively disposed in the notched recesses. Each guiding assembly includes two tubular members which respectively and sealingly engage in a respective one of the first coupling holes and a respective one of the second coupling holes and which are coaxially coupled with each other to bring the first and second coupling holes into fluid communication with each other, and a fastening member which is disposed to fasten the tubular members. The tubular members of each guiding assembly respectively have two tubular portions which are rotatably and respectively disposed in the first and second coupling holes and which respectively have through passages for establishing a fluid communication between the first and second coupling holes, and two lug portions which extend respectively, radially and outwardly from the tubular portions. The fastening member is disposed to fasten the lug portions to each other. Each guiding assembly is rotatable relative to the first and second nuts between a non-stored position, where the lug portions of the tubular members project outwardly of the first and second nuts from a respective one of the notched recesses, and a stored position, where the lug portions are retreated in the respective notched recess to be concealed between the first and second nuts.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
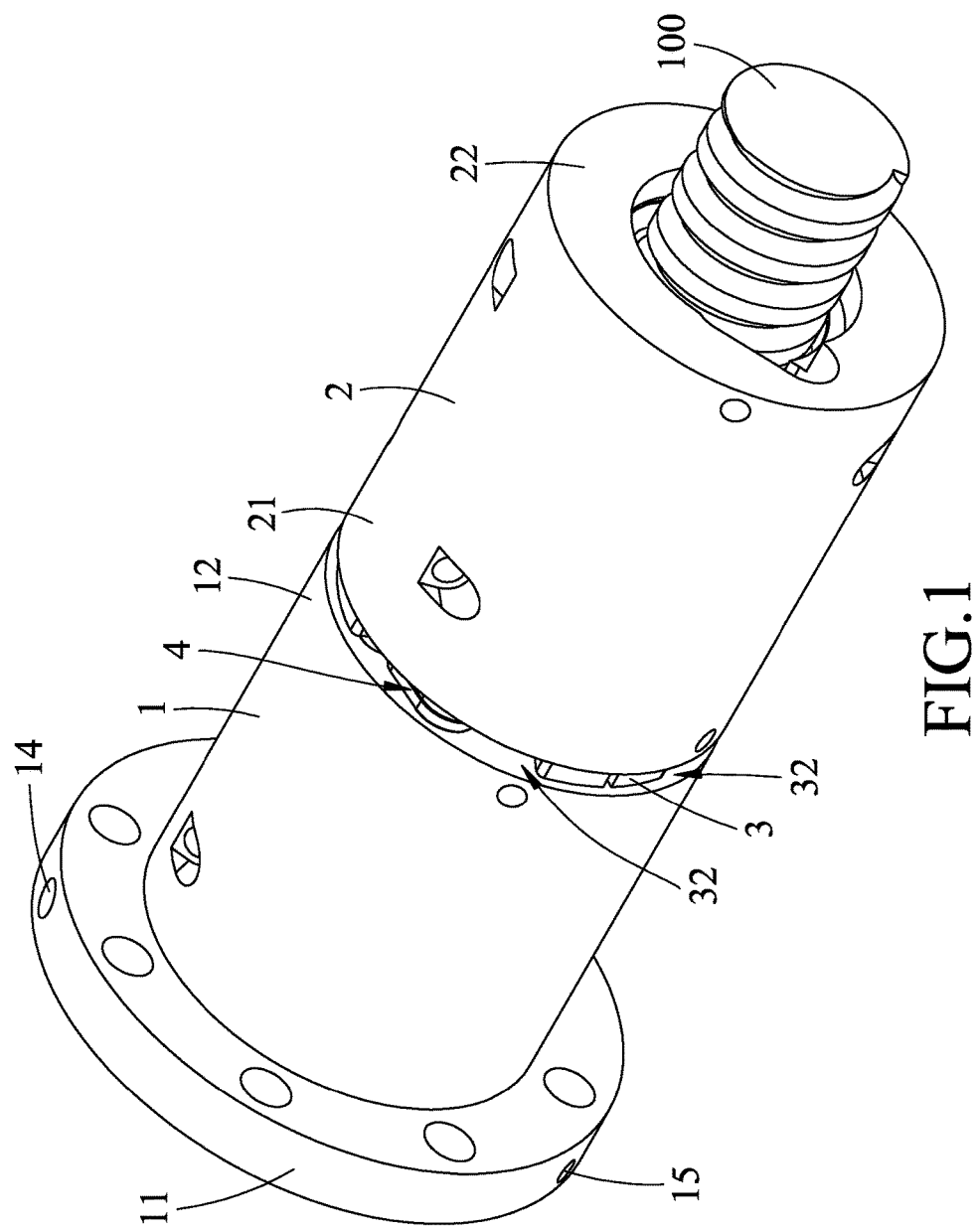
FIG. 1 is a perspective view illustrating an embodiment of a double-nut cooling ball screw according to the disclosure.
Figure 2:
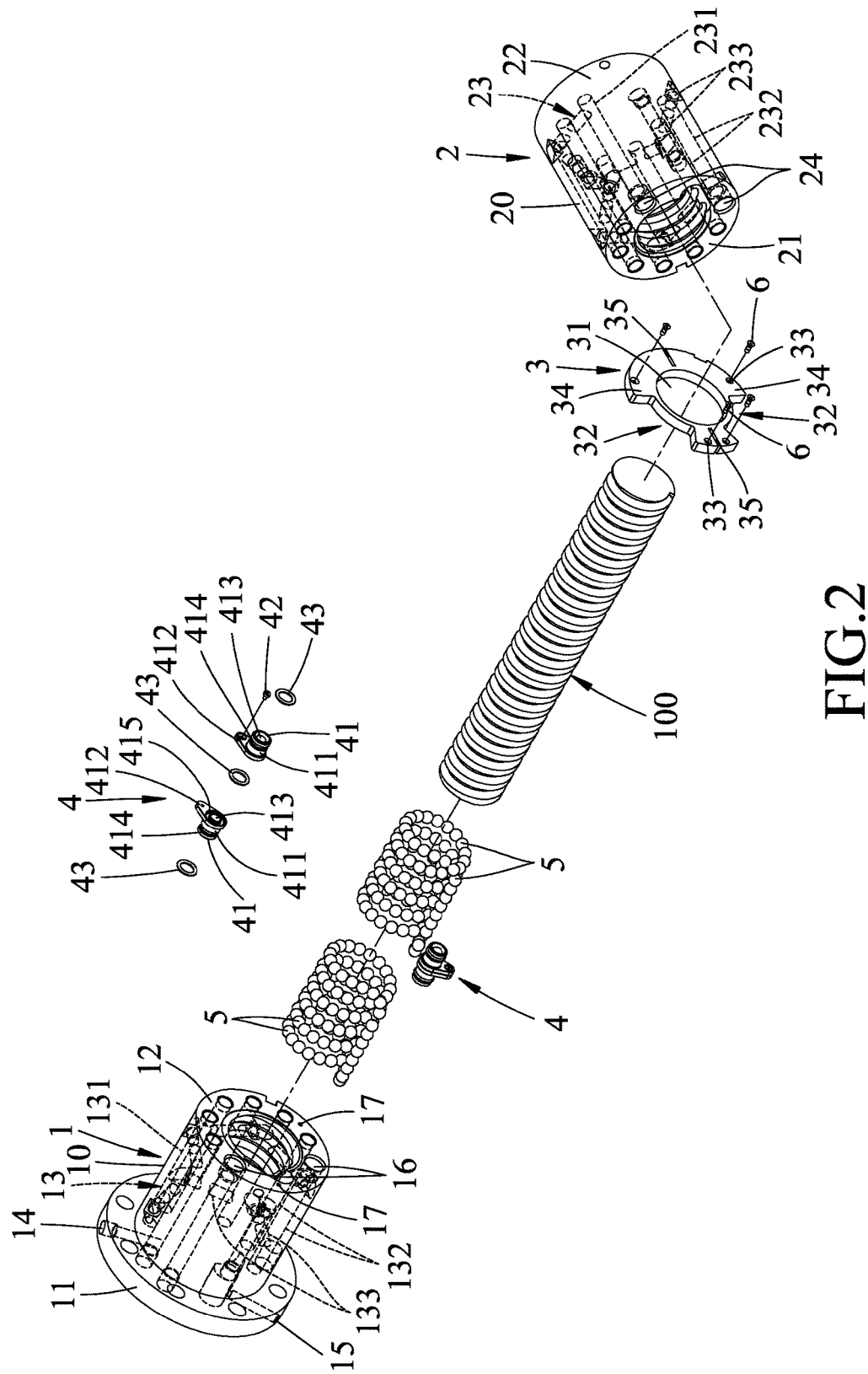
FIG. 2 is an exploded perspective view of the embodiment.
Figure 3:
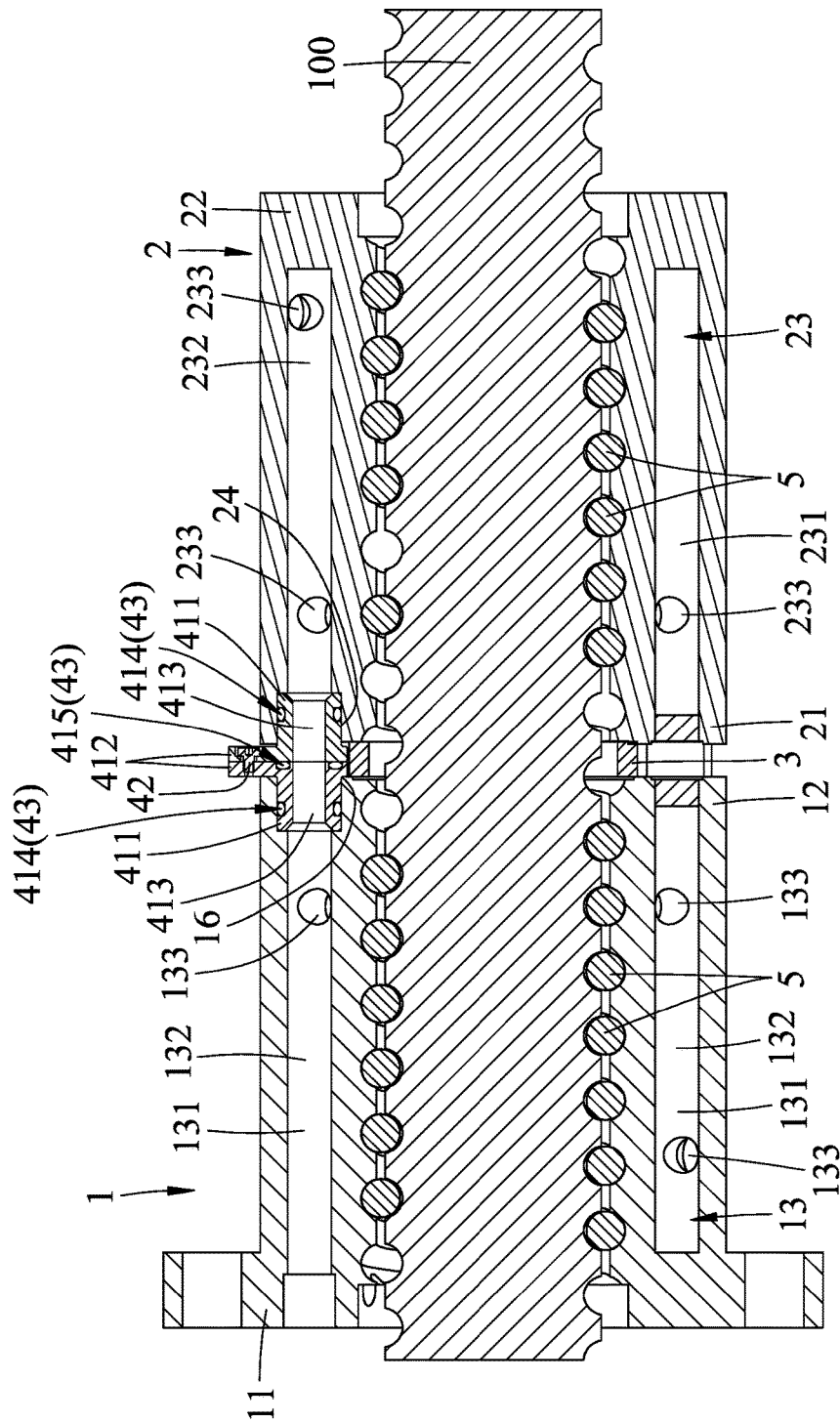
FIG. 3 is a sectional view of the embodiment.

Referring to FIGS. 1 to 3, an embodiment of a double-nut cooling ball screw according to the disclosure includes a threaded shaft 100, a first nut 1, a second nut 2, a spacer 3 and a plurality of guiding assemblies 4.

The threaded shaft 100 extends along an axis. The first nut 1 threadedly engages with the threaded shaft 100 through a plurality of balls 5, and includes an enlarged head end portion 11, a first surrounding wall 10 which extends from the head end portion 11 along the axis to terminate at a first connecting end portion 12, a first cooling channel assembly 13 which is formed in the first surrounding wall 10, an inlet port 14 which is formed through the head end portion 11 and which is in fluid communication with the first cooling channel assembly 13, an outlet port 15 which is formed through the head end portion 11 and which is in fluid communication with the first cooling channel assembly 13, two first coupling holes 16 which are formed through the first connecting end portion 12 and which are angularly displaced from each other about the axis, and four pin holes 17 which are formed in the first connecting end portion 12 and which are angularly displaced from one another about the axis. The first cooling channel assembly 13 includes two first cooling channels 131 extending in the first surrounding wall 10 to terminate at head ends that are proximate to the head end portion 11 and that are respectively connected with the inlet port 14 and the outlet port 15, and connecting ends that are proximate to the first connecting end portion 12 and that are respectively connected with the first coupling holes 16, such that each of the first coupling holes 16 is in fluid communication with the first cooling channel assembly 13. In this embodiment, each of the first cooling channels 131 has a plurality of channel segments 132 angularly displaced from each other about the axis and each elongated in the direction of the axis, and a plurality of connecting segments 133 each connected between two adjacent ones of the channel segments 132.

The second nut 2 threadedly engages with the threaded shaft 100 through a plurality of balls 5, and includes a second surrounding wall 20 which extends along the axis toward the first connecting end portion 12 to terminate at a second connecting end portion 21, a tail end portion 22 opposite to the second connecting end portion 21 along the axis, a second cooling channel assembly 23 which is formed in the second surrounding wall 20, and two second coupling holes 24 which are formed through the second connecting end portion 21 to be respectively aligned with the first coupling holes 16 in a direction of the axis, and each of which is in fluid communication with the second cooling channel assembly 23. In this embodiment, the second cooling channel assembly 23 has a second cooling channel 231 extending in the second surrounding wall 20 to terminate at two connecting ends that are proximate to the second connecting end portion 21 and that are respectively connected with the second coupling holes 24. The second cooling channel 231 has a plurality of channel segments 232 angularly displaced from each other about the axis and each elongated in the direction of the axis, and a plurality of connecting segments 233 each connected between two adjacent ones of the channel segments 232.

The spacer 3 is interposed between the first and second connecting end portions 12, 21, and has an axial hole 31 to be sleeved on the threaded shaft 100, and two notched recesses 32 which are recessed radially and inwardly from a peripheral surface of the spacer 3 and which are angularly displaced from each other about the axis, and four through holes 33 formed to be respectively aligned with the pin holes 17 of the first nut 1. The spacer 3 is placed on the first nut 1 by four pins 6 which extend through the through holes 33 and into the pin holes 17. Alternatively, the second connecting end portion 21 of the second nut 2 may be formed with pin holes such that the spacer 3 is placed on the second nut 2. In this embodiment, the spacer 3 has two splits 35 each extending radially and inwardly from the peripheral surface thereof to divide the spacer 3 into two spacer segments 34. Each of the notched recesses 32 is formed in the respective spacer segment 34.

The guiding assemblies 4 are respectively disposed in the notched recesses 32. Each of the guiding assemblies 4 includes two tubular members 41 which respectively and sealingly engage in the respective first coupling hole 16 and the respective second coupling hole 24 and which are coaxially coupled with each other to bring the first and second coupling holes 16, 24 into fluid communication with each other, a fastening member 42 which is disposed to fasten the tubular members 41, and three O-rings 43. The tubular members 41 of each guiding assembly 4 respectively have two tubular portions 411 which are respectively and rotatably disposed in the first and second coupling holes 16, 24 and which respectively have through passages 413 for establishing a fluid communication between the first and second coupling holes 16, 24, and two lug portions 412 which extends respectively, radially and outwardly from the tubular portions 411. Each of the tubular portions 411 has an annular groove 414 formed in a peripheral surface thereof. One of the tubular portions 411 has an end annular groove 415 formed in an end surface thereof. Two of the O-rings 43 are respectively disposed in the annular grooves 414 to keep a sealing engagement between each of the tubular members 41 and the respective one of the first and second nuts 1, 2. A remaining one of the O-rings 43 is disposed in the end annular groove 415 to keep a sealing engagement between the tubular members 41. In this embodiment, each of the fastening members 42 is a screw fastener threadedly engages with the lug portions 412 to tighten the lug portions 412 to each other. Alternatively, each fastening member 42 may be in the form of a clamp configured to clamp the lug portions 412.

Figure 7:
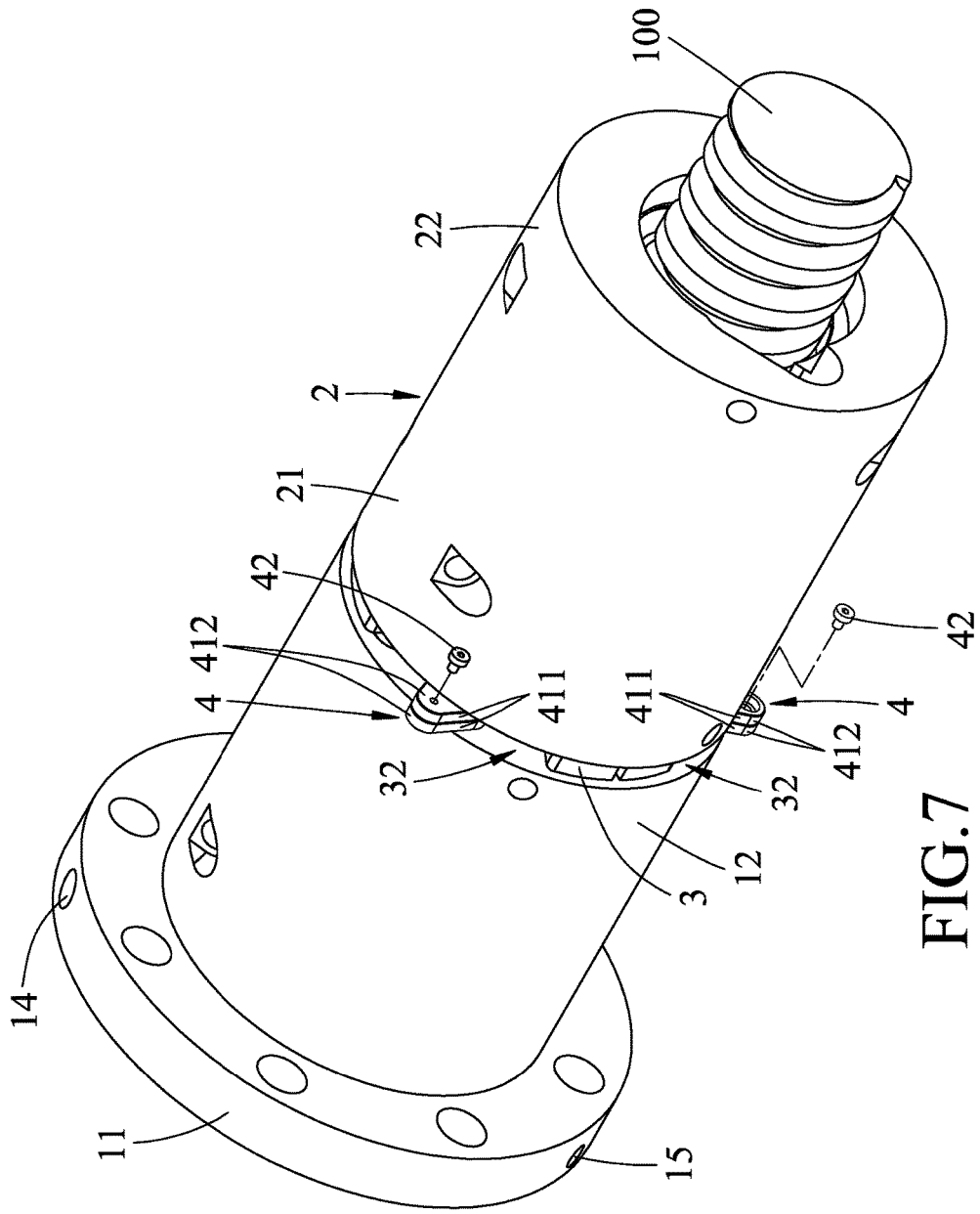
FIG. 7 is a perspective view illustrating a state when the embodiment is in an assembling process and two guiding assemblies of the embodiment are in a non-stored position.
Figure 8:
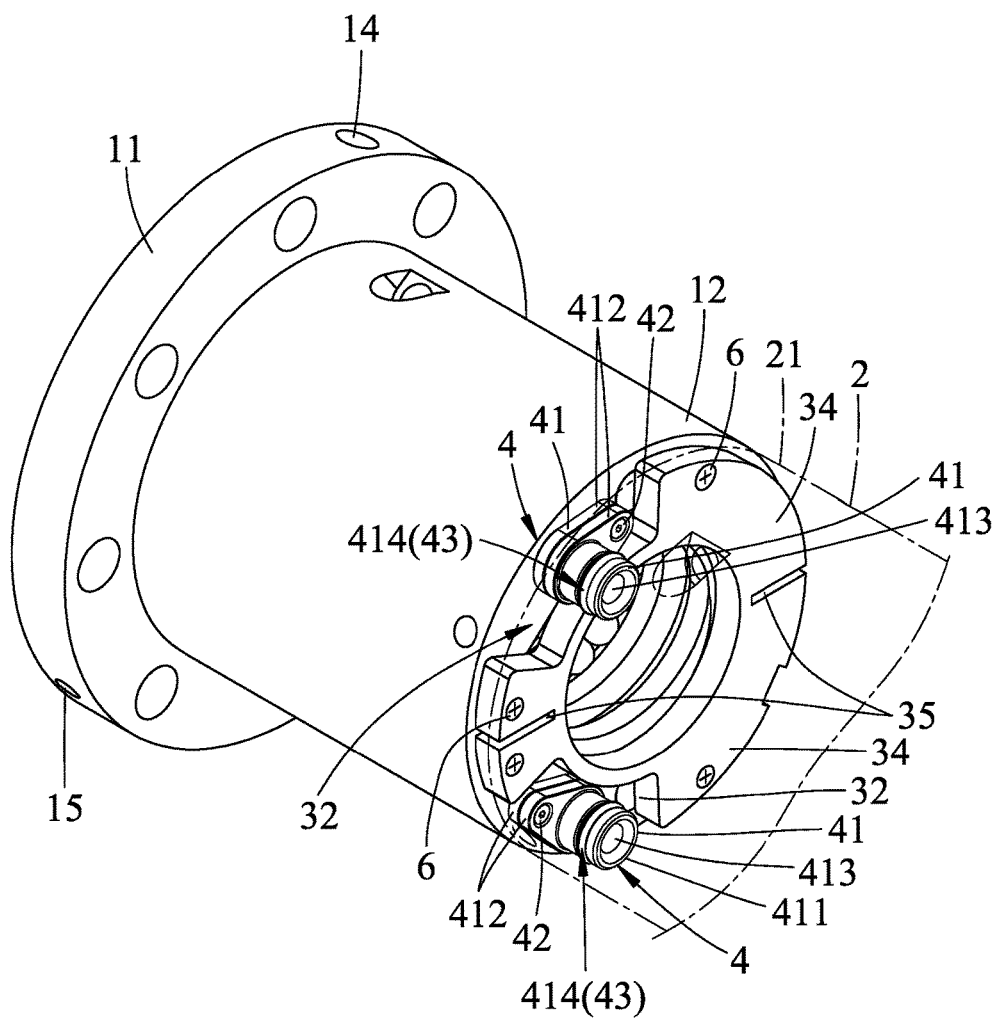
FIG. 8 is a fragmentary perspective view illustrating a state when the embodiment is in a final assembling process and the guiding assemblies are in a stored position.

Each guiding assembly 4 is rotatable relative to the first and second nuts 1, 2 between a non-stored position (as shown in FIGS. 3 and 7), where the lug portions 412 of the tubular members 41 project outwardly of the first and second nuts 1, 2 from the respective notched recess 32, and a stored position (as shown in FIGS. 1 and 8), where the lug portions 412 of the tubular members 41 are retreated in the respective notched recess 32 to be concealed between the first and second nuts 1, 2.

By flowing of a coolant from an external coolant circulating system (not shown) through the inlet port 14, one of the first cooling channels 131, one of the guiding assemblies 4, the second cooling channel 231, the other one of the guiding assemblies 4, the other one of the first cooling channels 131 and the outlet port 15 and back to the coolant circulating system, the ball screw can be cooled in a single circulating direction so as to ensure smooth flowing of the coolant without obstruction to thereby enhancing the cooling effect.

It is noted that the numbers of the inlet port 14, the outlet port 15, of the first and second coupling holes 16, 24, of the guiding assemblies 4, and of the first and second cooling channels 131, 231 may be changed depending on different needs so as to form a plurality of above-mentioned single-direction circulation channel systems.

Figure 4:
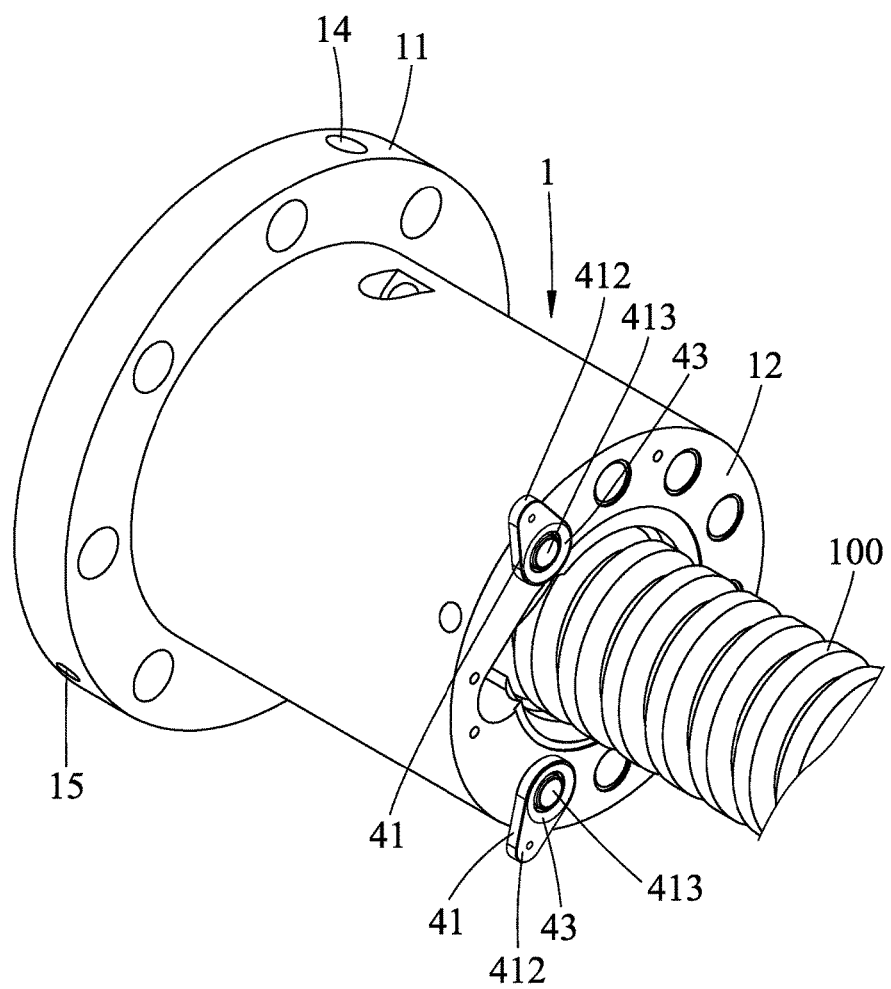
FIGS. 4 to 6 are fragmentary perspective views illustrating a state when the embodiment is in an assembling process.
Figure 5:
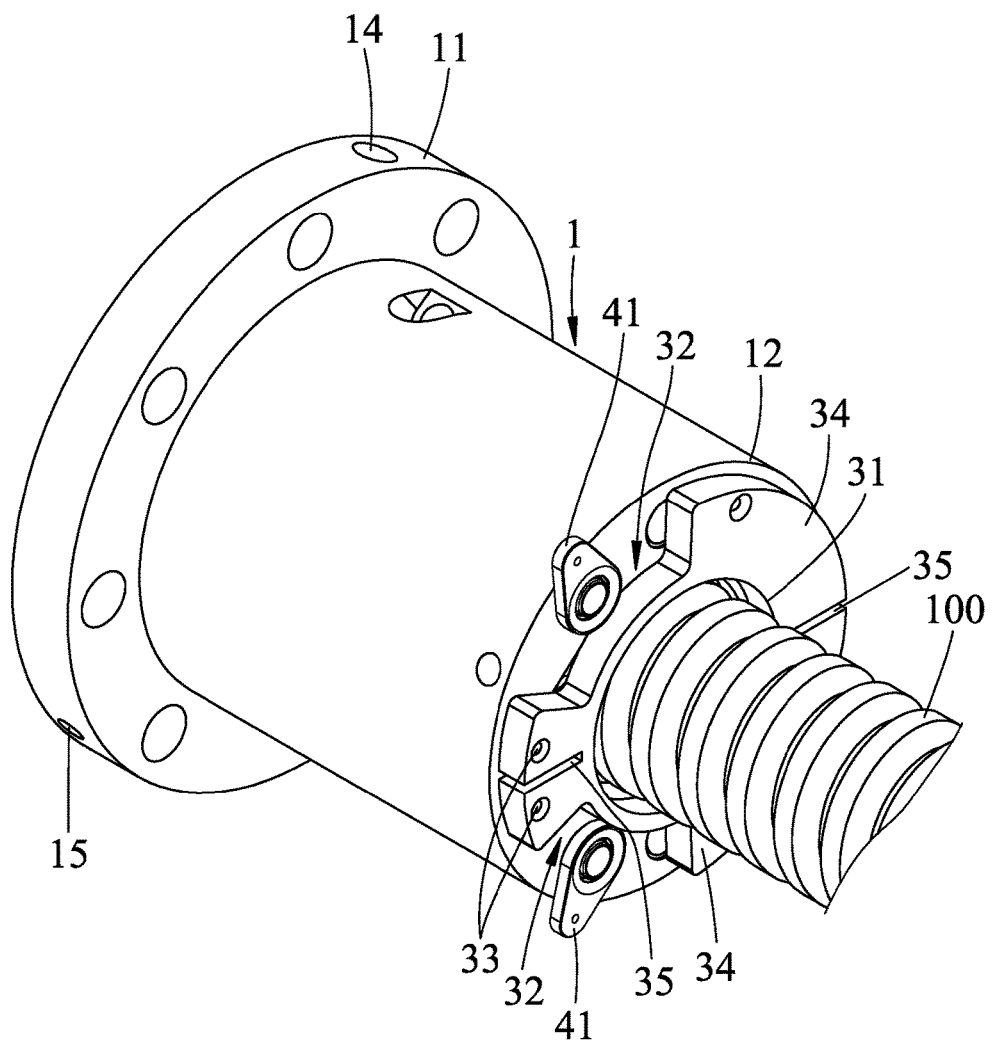
Figure 6:
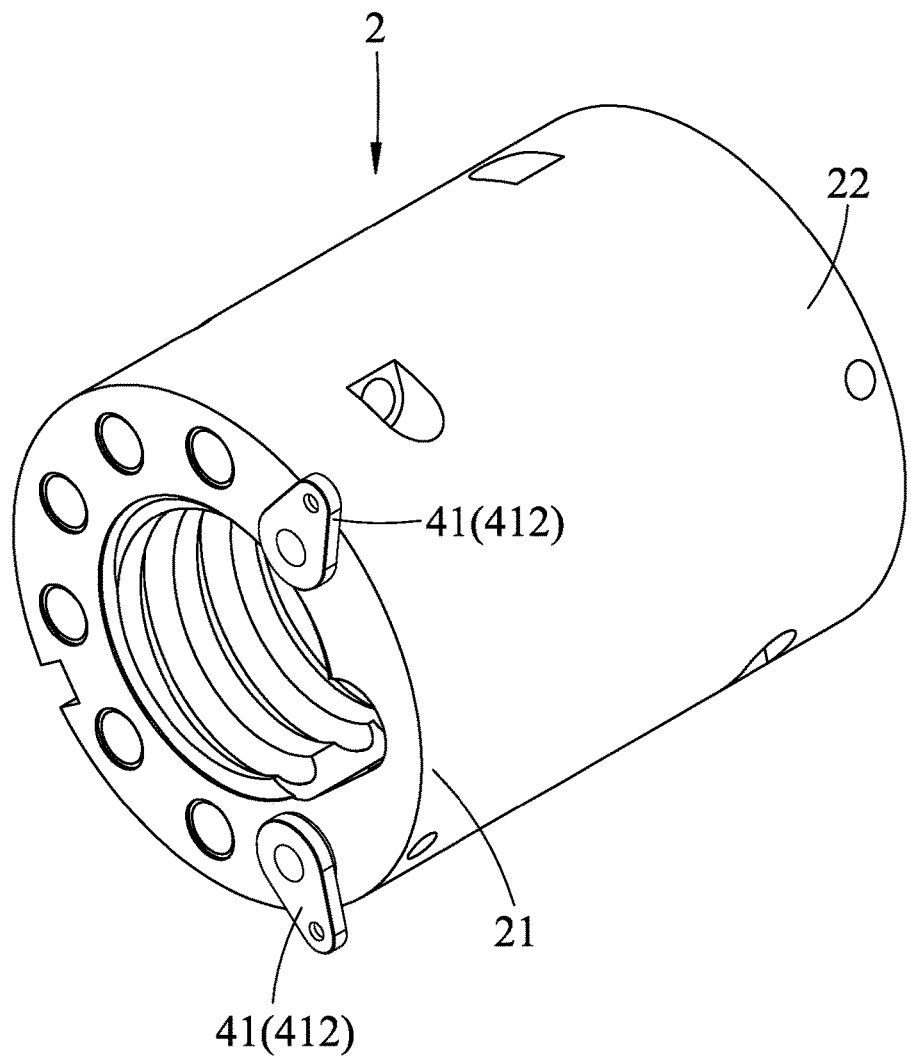

For assembling the ball screw, firstly, referring to FIGS. 2 to 4, the first nut 1 is threadedly engaged with the threaded shaft 100, and one of the tubular members 41 of each guiding assembly 4 is disposed in the respective first coupling hole 16 to permit the respective lug portion 412 to project outwardly of a peripheral surface of the first nut 1. Subsequently, referring to FIGS. 2 and 5, the spacer 3 is sleeved on the threaded shaft 100 through the axial hole 31 and is secured to the first connecting end portion 12 of the first nut 1. Alternatively, the spacer segments 34 of the spacer 3 may be separated from each other by breaking along the splits 35 and may be individually placed on the threaded shaft 100 to be secured on the first connecting end portion 12. In this manner, the action of sleeving the spacer 3 on the threaded shaft 100 is not required, thereby facilitating the task of assembly. Subsequently, referring to FIGS. 2 and 6, the other one of the tubular members 41 of each guiding assembly 4 is disposed in the respective second coupling hole 24 to permit the respective lug portion 412 to project outwardly of a peripheral surface of the second nut 2. Subsequently, referring to FIGS. 2 and 7, the second nut 2 is threadedly engaged with the threaded shaft 100. The lug portions 412 of the tubular members 41 of each guiding assembly 4 are secured to each other. Finally, referring to FIGS. 2 and 8, each guiding assembly 4 is rotated to the stored position to retreat the lug portions 412 in the notched recesses 32 to be concealed between the first and second nuts 1, 2.

For each guiding assembly 4, with the tubular members 41 being respectively disposed in the first and second coupling holes 16, 24 of the first and second nuts 1, 2, and with the fastening member 42 sealingly securing the lug portions 412 to each other, a sealing fluid communication between the first and second cooling channel assemblies 13, 23 is established. Each guiding assembly 4 can be rotated to the stored position when the tubular members 41 of each guiding assembly 4 are fastened, thereby preventing exposure which may adversely affect operation of the ball screw. Moreover, each guiding assembly 4 can be rotated to the non-stored position to permit removal of each fastening member 42 so as to separate the tubular members 41 of each guiding assembly 4 for facilitating replacement thereof.

As illustrated, the ball screw of this embodiment has a construction that is easy to be assembled without the need of using an additional tool, and that can prevent damage to the sealing members and eliminate the problem associated with separation of the sealing members from the nut members encountered in the above-mentioned conventional ball screw. Moreover, a structural modification of the first and second nuts is not required, thereby permitting the first and second nuts to have a predetermined outer diameter and to be fabricated in a conventional manner and process. Also, a coolant circulating in a single direction in the ball screw can be performed.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A double-nut cooling ball screw comprising:
a threaded shaft extending along an axis;
a first nut threadedly engaging with said threaded shaft through a first plurality of balls, and including a head end portion, a first surrounding wall which extends from said head end portion along the axis to terminate at a first connecting end portion, a first cooling channel assembly which is formed in said first surrounding wall, an inlet port which is formed through said head end portion and which is in fluid communication with said first cooling channel assembly, an outlet port which is formed through said head end portion and which is in fluid communication with said first cooling channel assembly, and a plurality of first coupling holes which are formed through said first connecting end portion and which are angularly displaced from each other about the axis, each of said first coupling holes being in fluid communication with said first cooling channel assembly;
a second nut threadedly engaging with said threaded shaft through a second plurality of balls, and including a second surrounding wall which extends along the axis toward said first connecting end portion to terminate at a second connecting end portion, a second cooling channel assembly which is formed in said second surrounding wall, and a plurality of second coupling holes which are formed through said second connecting end portion to be respectively aligned with said first coupling holes in a direction of the axis, and each of which is in fluid communication with said second cooling channel assembly;
a spacer interposed between said first and second connecting end portions, and having an axial hole to be sleeved on said threaded shaft, and a plurality of notched recesses which are recessed radially and inwardly from a peripheral surface of said spacer and which are angularly displaced from each other about the axis; and
a plurality of guiding assemblies respectively disposed in said notched recesses, and each including two tubular members which respectively and sealingly engage in a respective one of said first coupling holes and a respective one of said second coupling holes and which are coaxially coupled with each other to bring said first and second coupling holes into fluid communication with each other, and a fastening member which is disposed to fasten said tubular members, said tubular members of each of said guiding assemblies respectively having two tubular portions which are rotatably and respectively disposed in said first and second coupling holes and which respectively have through passages for establishing a fluid communication between said first and second coupling holes, and two lug portions which extends respectively, radially and outwardly from said tubular portions, said fastening member being disposed to fasten said lug portions to each other, each of said guiding assemblies being rotatable relative to said first and second nuts between a non-stored position, where said lug portions of said tubular members project outwardly of said first and second nuts from a respective one of said notched recesses, and a stored position, where said lug portions of said tubular members are retreated in the respective one of said notched recesses to be concealed between said first and second nuts.

2. The double-nut cooling ball screw as claimed in claim 1, wherein each of said tubular members has an annular groove formed in a peripheral surface thereof, one of said tubular members of each of said guiding assemblies having an end annular groove formed in an end surface thereof, each of said guiding assemblies further including a plurality of O-rings which are disposed in said annular groove and said end annular groove, so as to keep a sealing engagement between each of said tubular members and the respective one of said first and second nuts, and to keep a sealing engagement between said tubular members.

3. The double-nut cooling ball screw as claimed in claim 1, wherein said first cooling channel assembly includes two first cooling channels extending in said first surrounding wall to terminate at head ends that are proximate to said head end portion and that are connected with said inlet port and said outlet port, and connecting ends that are proximate to said first connecting end portion and that are connected with said first coupling holes.

4. The double-nut cooling ball screw as claimed in claim 3, wherein each of said first cooling channels has a plurality of channel segments angularly displaced from each other about the axis and each elongated in the direction of the axis, and a plurality of connecting segments each connected between two adjacent ones of said channel segments.

5. The double-nut cooling ball screw as claimed in claim 1, wherein said second cooling channel assembly has a second cooling channel extending in said second surrounding wall to terminate at two connecting ends that are proximate to said second connecting end portion and that are connected with two of said second coupling holes.

6. The double-nut cooling ball screw as claimed in claim 5, wherein said second cooling channel has a plurality of channel segments angularly displaced from each other about the axis and each elongated in the direction of the axis, and a plurality of connecting segments each connected between two adjacent ones of said channel segments.

7. The double-nut cooling ball screw as claimed in claim 1, wherein one of said first and second connecting end portions has a plurality of pin holes angularly displaced from each other about the axis.

8. The double-nut cooling ball screw as claimed in claim 7, wherein said spacer has a plurality of through holes formed to be aligned with said pin holes, respectively.

9. The double-nut cooling ball screw as claimed in claim 1, wherein said spacer has a plurality of splits each extending radially and inwardly from said peripheral surface thereof to divide said spacer into a plurality of spacer segments, each of said notched recesses being formed in a respective one of said spacer segments.

10. The double-nut cooling ball screw as claimed in claim 1, wherein said fastening member of each of said guiding assemblies is a screw fastener threadedly engaging with said lug portions to tighten said lug portions to each other.

* * * * *